United States Patent [19]

La Bate

[11] 4,111,706

[45] Sep. 5, 1978

[54] SEALING AND FILLING MATERIAL FOR METALLURGICAL APPLICATIONS

[76] Inventor: Micheal Donald La Bate, 115 Hazen Ave., Ellwood City, Pa. 16117

[21] Appl. No.: 839,627

[22] Filed: Oct. 5, 1977

Related U.S. Application Data

[63] Continuation-in-part of Ser. No. 689,142, May 24, 1976, abandoned.

[51] Int. Cl.² .................... C04B 35/04; C04B 35/10; C04B 35/56
[52] U.S. Cl. .................................... 106/44; 106/58; 106/63; 106/65; 106/67; 106/69
[58] Field of Search .............. 106/38.23, 38.5 R, 63, 106/55, 57, 58, 67, 69, 44

[56] References Cited

U.S. PATENT DOCUMENTS

| | | | |
|---|---|---|---|
| 3,558,591 | 1/1971 | Yendrek et al. | 106/38.5 R |
| 3,989,533 | 11/1976 | Jago | 106/58 |
| 4,012,262 | 3/1977 | Patterson et al. | 106/38.5 R |

*Primary Examiner*—J. Poer
*Attorney, Agent, or Firm*—Webster B. Harpman

[57] ABSTRACT

A material is disclosed which is particularly suitable for sealing the gaps between the component parts of ingot casting and like molds and for bonding core parts together and filling cavities in stools on which ingot molds are positioned, the material comprising a mixture of ceramic and consumable materials with or without exothermic materials as desired and a wetting solution so as to form a paste-like consistency conveniently packaged in shaped flexible plastic or paper containers which may be readily applied to the indicated areas.

4 Claims, No Drawings

SEALING AND FILLING MATERIAL FOR METALLURGICAL APPLICATIONS

This application is a continuation in part of application for patent Ser. No. 689,142, filed May 24, 1976, now abandoned.

BACKGROUND OF THE INVENTION

(1) Field of the Invention

This invention relates to ingot molds, stools for supporting them and material for sealing or filling cavities or openings between or in the same to facilitate the retention of hot metal therein.

(2) Description of the Prior Art

Prior materials have generally comprised mixtures of Zircon flour, china clay, liquid sodium silicate, Bentonite, soap powder or their equivalents and water as a wetting agent to form a putty-like consistency which can be used for the indicated purpose. See for example the disclosure in British Pat. No 1,161,109 or British Pat. No. 1,404,312.

The present invention introduces a consumable material into the mixture which enables the same to have a predetermined lifetime and a self-destructing capability.

SUMMARY OF THE INVENTION

A sealing and filling material for metallurgical applications is disclosed which is formed of ceramic materials, suitable wetting agents and a consumable material, the amount of which and the size and shape of the shaped material when used in a hot metal application for example enables the material to have effective sealing and cavity filling characteristics during a predetermined period of time and the capability of partial self-destruction facilitating the freeing of the parts joined or filled and providing clean reuseable surfaces for a subsequent operation.

DESCRIPTION OF THE PREFERRED EMBODIMENT

A material suitable for use in closing gaps between ingot molds and supporting stools and the like during hot metal containing periods is formed of a mixture comprising from 8% to 10% of consumable wood fiber, 45% to 50% of finely ground fired clay, limestone or sand particles and 40% to 47% of a premixed wetting solution containing 60% to 65% water, 5% to 15% calcium chloride and 2% to 20% of phosphoric acid or the equivalent. The consumable wood fiber finely ground fired clay and the wetting solution are mixed thoroughly so as to produce a compound of a putty-like consistency and the same positioned in pre-shaped plastic or paper containers which may advantageously take the shape of relatively thin elongated narrow sections of the compound, wedge-shaped sections of the compound or simple containers of the compound of various shapes which would correspond with the size and area of cavities in ingot molds and/or the stools on which they are usually positioned.

The material thus compounded and packaged retains its putty-like consistency and is thereby capable of being shaped by the registration of the parts of the ingot mold with respect to the stool so as to close any openings which would otherwise exist therebetween and which would permit the formation of a fin on the ingot which seriously complicates removing the ingot from the ingot mold as will be understood by those skilled in the art.

The compound disclosed herein may be advantageously modified by the addition of thermit, a mixture of finely divided metallic aluminum and one or more oxides such as iron which will when ignited produce extremely high temperatures as a result of the union of the aluminum with the oxygen of the oxide. The modified compound would comprise between about 50% to 70% thermit and the balance comprising the consumable wood fiber, the finely ground fired clay and the premixed wetting solution in the same proporations as hereinbefore set forth.

Alternately the wetting solutions can be eliminated and the consumable wood fiber, the finely ground fired clay and the thermit dry packed.

When the thermit is ignited a molten slag is formed in which the particulate refractory material is bound together by a matrix of the slag after the exothermic reaction. The compound thus exothermically reacts to advantageously fill the spaces between the ingot mold and a stool or a cavity in the stool or the ingot mold and produces a resultant material which is sufficiently ceramic that molten metal introduced into the ingot mold will not fuse thereto.

The consumable ingredient in the compound result in a predetermined life dependent upon the thickness of the compound in its environmental position and the amount of the consumable wood fiber in the compound so that the ingot mold and/or stool supporting the same have a desirable sealing and filling material during the containment of hot metal therein with the filling and sealing material partially selfdestructing after the removal of the ingot or the like therefrom.

It will thus be seen that the sealing and filling material disclosed herein will in either of its forms result in a satisfactory blocking material to prevent leakage of hot metal from ingot molds and the like and it will occur to those skilled in the art that the material may be used in repairing heat eroded walls, frames, doors and the like as in connection with open hearths, heat treating installations and including BOF installations and in such applications the material may be positioned and held by the engagement of the adjoining or abutting surfaces of the articles or the material may be installed as by ramming with a pneumatic gun. In addition to the finely ground fired clay, used fire brick reduced to particulate form may be advantageously used and additional materials which are suitable include silicon carbide, magnesite, aluminum silicates, burned dolomite, alumina and various mixtures of these materials or the like. The particle size is not particularly critical and may run from finely ground to particles an eighth of an inch more or less.

A further modification in the material is useful particularly when the exothermic ingredients are employed as hereinbefore described. Such a desirable sealing and filling compound would include the wood fiber or its equivalent, the finely ground fired clay or its equivalent, the thermit and a wetting agent such as ethyl alcohol which is compatible with the thermit and permits the desirable exothermic reaction.

Although but two embodiments of the present invention have been described, it will be apparent to those skilled in the art that various other changes and modifications may be made therein without departing from the spirit of the invention and having thus described my invention.

What I claim is:

1. A sealing and filling material for metallurgical applications comprising a compound formed of 8% to 10% of consumable wood fiber, 45% to 50% of a non-consumable material from the group consisting of finely ground fired clay, silicon carbide, magnesite, burned dolomite, alumina, ground limestone and fine sand particles and 40% 47% of a wetting solution to bind said materials into a yieldable, shapable compound, said wetting solution consisting of an aqueous solution substantially 60% to 65% water, 5% to 15% calcium chloride and 2% to 20% phosphoric acid.

2. The sealing and filling material set forth in claim 1 packaged in a pre-shaped flexible container capable of assuming a desired shape and retaining the wetting solution in the compound.

3. A sealing and filling material for metallurgical applications comprising a compound formed of 8% to 10% of consumable wood fiber, 45% to 50% of a non-consumable material from the group consisting of finely ground fired clay, silicon carbide, magnesite, burned dolomite, alumina, ground limestone and fine sand particles and 40% to 47% of a wetting solution to bind said materials into a yieldable, shapable compound, said wetting solution consisting of ethyl alcohol.

4. The sealing and filling material set forth in claim 3 packaged in a pre-shaped flexible container capable of assuming a desired shape and retaining the wetting solution in the compound.

* * * * *